US006932298B1

(12) United States Patent
Mills

(10) Patent No.: US 6,932,298 B1
(45) Date of Patent: Aug. 23, 2005

(54) MODULAR OVERHEAD PRIVACY SYSTEM

(75) Inventor: Christopher J. Mills, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/759,464

(22) Filed: Jan. 19, 2004

(51) Int. Cl.$^7$ .............................................. B64D 11/00
(52) U.S. Cl. ............................... 244/118.5; 244/118.6; 105/315
(58) Field of Search ................... 244/118.5, 118.6; 105/314, 315, 316; 114/192

(56) References Cited

U.S. PATENT DOCUMENTS

| | | | |
|---|---|---|---|
| 4,066,227 A | | 1/1978 | Buchsel .................... 244/118 P |
| 4,686,908 A | * | 8/1987 | Legrand ...................... 105/315 |
| 5,115,999 A | | 5/1992 | Buchsel et al. .......... 244/118.5 |
| 5,314,143 A | | 5/1994 | Luria ........................ 244/118.1 |
| 5,784,836 A | | 7/1998 | Ehrick ......................... 52/79.8 |
| 6,056,239 A | * | 5/2000 | Cantu et al. ............. 244/118.6 |
| 6,073,883 A | | 6/2000 | Ohlmann et al. ........ 244/118.5 |
| 6,464,169 B1 | * | 10/2002 | Johnson et al. .......... 244/118.5 |
| 6,520,451 B1 | * | 2/2003 | Moore ..................... 244/118.5 |
| 6,581,876 B2 | * | 6/2003 | Cheung .................... 244/118.5 |
| 6,616,098 B2 | * | 9/2003 | Mills ........................ 244/118.5 |
| 6,659,225 B2 | * | 12/2003 | Olliges et al. ................. 182/97 |

* cited by examiner

*Primary Examiner*—J. Woodrow Eldred
(74) *Attorney, Agent, or Firm*—Harness Dickey & Pierce P.L.C.

(57) ABSTRACT

A modular overhead privacy system for a mobile platform is provided. The modular overhead privacy system includes a plurality of independent privacy modules located longitudinally spaced apart, above a passenger cabin, in an overhead crown area of the mobile platform. The modular overhead privacy system additionally includes a plurality of private access stairways providing access to the privacy modules from the passenger cabin. Each private module is accessible by an independent one of the private access stairways. Each privacy module includes at least one berth that provides a passenger or crew member a private reposing space separate from the passenger cabin. The privacy modules are longitudinally spaced apart in accordance with a seat pitch of a plurality of rows of seats in the passenger cabin. Therefore, each access stairway descends from the respective privacy module such that a bottom portion of the access stairway encroaches a single seat location within a specific row of seats.

8 Claims, 3 Drawing Sheets

MODULAR OVERHEAD PRIVACY SYSTEM

FIELD OF INVENTION

The invention relates generally to privacy quarter for passengers of a mobile platform. More specifically the invention relates to a modular overhead privacy system that provides a plurality of independent overhead privacy modules associated with specific groups of seats within a passenger cabin of the mobile platform.

BACKGROUND OF THE INVENTION

Often large passenger mobile platforms, such as aircraft, buses and trains travel long distances and many hours without stopping. As hours pass, this can sometimes place passengers under stress and discomfort. To address this, many mobile platforms have attempted to provide a measure of comfort by providing seats with additional padding and extended angles of reclination, and ample room for body movement without disturbing other passengers. However, these known methods of addressing passenger comfort and rest only minimally reduce passenger discomfort, often do not provide privacy and do not allow sufficient space for uninhibited freedom of movement.

Furthermore, when a passenger is traveling within a mobile platform for an extended period of time, the passenger needs some place to go, i.e. a destination or location within the mobile platform itself. To relieve the psychological and physical stress of long term travel, the passenger needs to get away from his or her seat and go some place else. To address this need of passenger for a separate space, away from their seat, some mobile platforms have incorporated lounges within the passenger cabin. Other mobile platforms have provided sleeping berths in an overhead area above the passenger cabin. However, both of these known methods typically require the area of many seats and therefore consume a considerable amount of the seating capacity within the passenger cabin. Additionally, known overhead resting accommodations typically include a single overhead structure having a plurality of berths accessible from a single aisle extending the entire longitudinal length of the overhead structure. These known overhead resting structures are generally only accessible by a single stairway at one end of the aisle or by a pair stairways located at the aft and forward ends of the aisle. This, at best, provides only minimal privacy as each passenger must traverse the aisle, passing by other berths which may be occupied, to reach an unoccupied berth.

Furthermore, these known methods of addressing passenger comfort and rest do not enhance a 'nesting' instinct of passengers where it is psychologically soothing and relaxing to have personal spaces, i.e. the passenger's seat and the resting accommodations, psychologically connected and in close proximity to one another, Therefore, it would be desirable to provide passengers traveling for extended periods on a mobile platform with private resting quarters that provide sufficient room to comfortably repose, are associated with their seats and minimizing the loss of seating capacity in the passenger cabin.

BRIEF SUMMARY OF THE INVENTION

In one preferred embodiment of the present invention, a modular overhead privacy system for a mobile platform is provided. The modular overhead privacy system includes a plurality of independent passenger privacy modules located longitudinally spaced apart, above a passenger cabin, in an overhead crown area of the mobile platform. The modular overhead privacy system additionally includes a plurality of private access stairways providing access to the privacy modules from the passenger cabin. Each private module is accessible by an independent one of the private access stairways. Each privacy module includes at least one berth that provides a passenger or crew member a private reposing space separate from the passenger cabin. Additionally, each privacy module is associated with at least one specific seat in the passenger cabin preferably located near a bottom portion of the respective access stairway. The privacy modules are longitudinally spaced apart in accordance with a seat pitch of a plurality of rows of seats in the passenger cabin. Therefore, each access stairway descends from the respective privacy module such that a bottom portion of the access stairway encroaches a single seat location within a specific row of seats. Spacing the privacy module in accordance with the seat pitch also positions each access stairway such that an upper portion of the access stairway provides ample passenger access to the row of seat behind the row of seats associated with the bottom portion.

The features, functions, and advantages can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
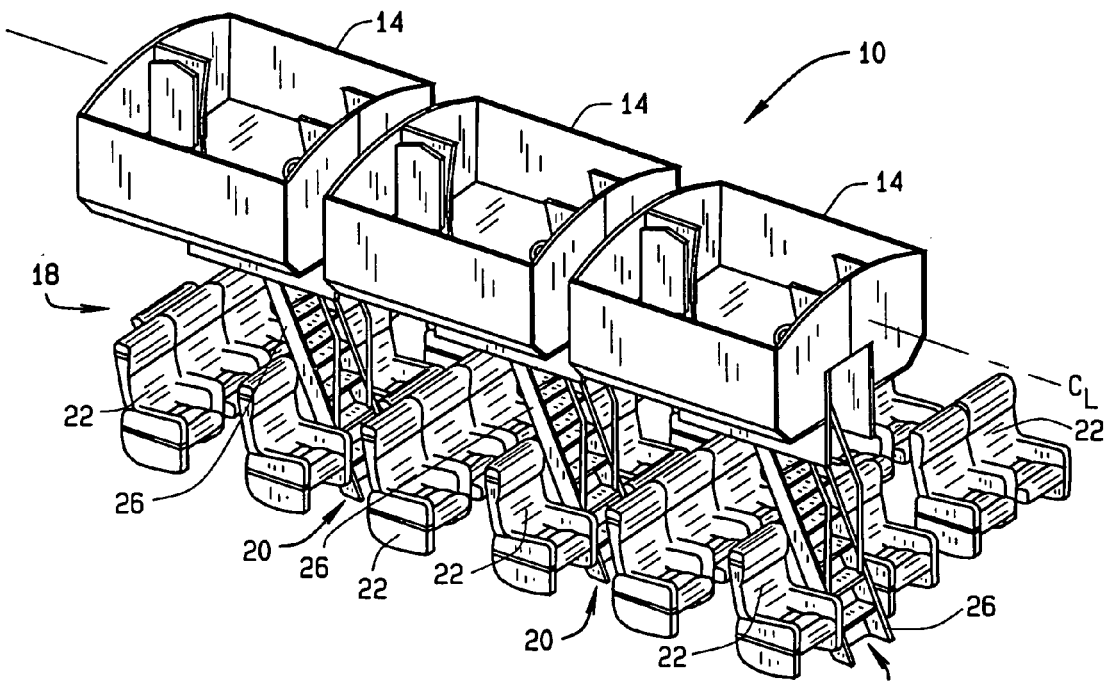
FIG. 1 is an isometric view of a modular overhead privacy system for a mobile platform in accordance with a preferred embodiment of the present invention.

FIG. 1 illustrates a modular overhead passenger privacy system 10 that includes a plurality of independent passenger privacy modules 14. The passenger privacy modules 14 are longitudinally spaced apart above a passenger cabin 18 in an overhead crown area of the mobile platform. Each privacy module is associated with one or more seat 22 in the passenger cabin 18 and encroaches only a single seating location 20. The privacy system 10 is centered within the overhead crown area such that a longitudinal axis of the privacy system 10 aligns with a longitudinal centerline $C_L$ of the mobile platform. Thus, the privacy modules 14 are longitudinally spaced apart along the longitudinal center line $C_L$.

Although FIG. 1 illustrates the seats 22 arranged such that each row of seats 22 includes a group of two seats 22 and group of three seats 22 separated by an passenger aisle 24, it should be understood that each privacy module 14 is longitudinally centered with a center line $C_L$ of the passenger cabin 18. Thus, for clarity in illustrating the association of each privacy module 14 with at least one seat 22, a third group of seats 22 in each row of seats 22 and a second passenger aisle 24 have not been shown in FIG. 1. More specifically, FIG. 1 illustrates a partial view of in what is commonly known as a 2-3-2 seating configuration with a group of two seats 22 and a second passenger aisle 24 not shown. Overhead passenger privacy system 10 is compatible for employment in any mobile platform having suitable room in the overhead crown area and suitable seating configuration. For example, the privacy system 10 is compatible for employment in mobile platforms having what is commonly known as a 3-3-3, a 2-5-2 or a 2-5-3 seating configuration. In each case the privacy system 10 would again align with the longitudinal centerline $C_L$ of the mobile platform.

The modular overhead passenger privacy system 10 further includes a plurality of access stairways 26 that provide access to the privacy modules 14 from the passenger cabin 18. Each privacy module 14 is accessible by a separate and independent one of the access stairways 26. As described above, each privacy module encroaches only a single seating location 20. More specifically, the access stairway 26 for each privacy module 14 encroaches only a single seating location 20 located along the center line $C_L$. As illustrated in FIG. 1, not all rows of seats have a seating location 20 that is encroached by an access stairway 26. Thus, only a single seating location 20 along the center line $C_L$ in specific rows of seats 22 is encroached by the access stairways 26. Therefore, each privacy module 14 is only accessible from a specific row of seats 22 in passenger cabin 18. In a preferred embodiment, each privacy module 14 is associated with at least one specific seat 22, preferably a group of seats 22, located near the respective access stairway 26 of each privacy module 14. Thus, only one seating position 20 would be encroached upon and that seating position 20 would be the seating position aligned with the centerline $C_L$ of the mobile platform.

Figure 2:
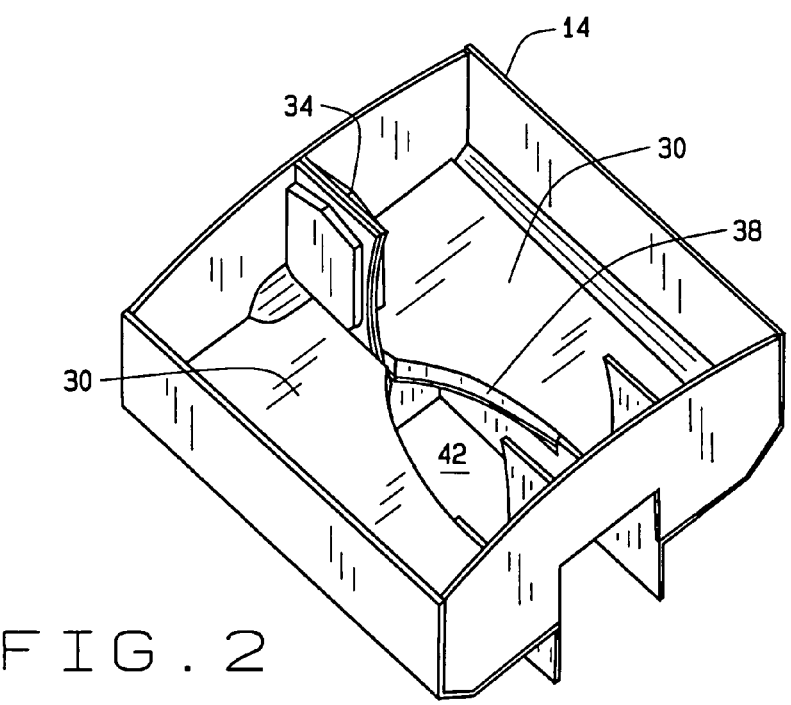
FIG. 2 is an isometric top view of a privacy module included in the modular overhead privacy system shown in FIG. 1.

FIG. 2 is an isometric top view of a privacy module included in the modular overhead privacy system shown in FIG. 1. Each privacy module includes at least one berth 30, preferably two births 30, as illustrated in FIG. 2. The births are separated by a partition 34 and a stairway access aperture 38 that leads to a non-traversing platform 42 associated with an upper portion of each access stairway 26. Each berth 30 is suitably sized to provide comfortable spacing for a passenger to repose within the berth 30. Each berth 30 also provides sufficient space so that a passenger can comfortably recline within the berth 30. The non-traversing platform 42 is adapted to allow a passenger to stand at least somewhat erect within a related privacy module 14 and/or to sit on the edge of the berth 30 and rest their feet on the platform 42. More specifically, the non-traversing platform is adapted to allow a passenger to freely and comfortably navigate themselves from the access stairway 26 to their assigned berth 30. As shown in FIG. 2, privacy module 14 does not have a center aisle. This allows each berth 30 within the privacy module to have additional width. This, in combination with the independent spaced apart privacy modules, also eliminates the disruptions to passenger in a berth 30 caused by passengers traversing a common aisle, as is common in known crew and passenger rest systems.

In a preferred embodiment, each berth 30 includes an entertainment and amenity system accessible for use by a passenger utilizing a privacy module 14. The entertainment and amenity system can includes such things as audio and video devices, internet access ports, security cameras, individual temperature control, alarm clock and intercom.

Figure 3:
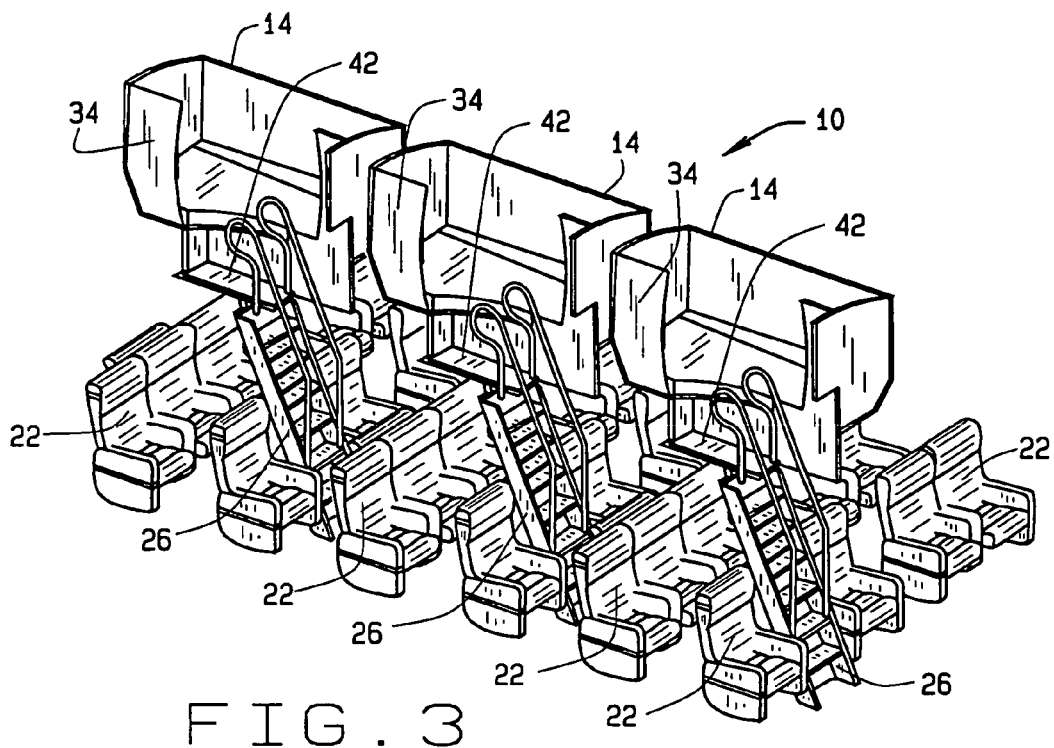
FIG. 3 is a sectional view of the modular overhead privacy system shown in FIG. 1.

FIG. 3 is a sectional view of the modular overhead privacy system 10 shown in FIG. 1. As seen in FIG. 3, each platform 42 is associated with an upper portion of a related access stairway 26. As described above, and now illustrated in FIG. 3, each privacy module 14 is associated with at least one seat 22 in the passenger cabin 18. More specifically, a bottom portion of each access stairway 26 is associated with, i.e. located next to or near, at least one seat 22. Furthermore, each access stairway 26 encroaches, i.e. consumes, only a single seat position in a specific row of seats 22 within the passenger cabin 18. Thus, a specific row of seats 22 is spatially connected to each privacy module 14.

It is envisioned that the seat or seats 22 associated with each privacy module 14 will be assigned to the passenger(s) assigned access to the associated privacy module 14. In a preferred embodiment, there is a single seat 22 associated with each berth 30. The assignment of the associated seats 22 to the passenger(s) assigned access to each privacy module 14 will provide such passenger(s) with a sense of centrality or unity of spaces. That is, such passengers will feel their private space is connected to their public space. This provides the passenger with a soothing psychological sense of spatial ownership, also referred to as nesting. For example, when a passenger of the mobile platform sits in a seat 22 for an extended period of time the passenger tends to become acclimated with that particular space within the passenger cabin 18. That is, the passenger brings their possessions, such as magazines, laptop computers and carryon luggage to that space and tends gain a sense of ownership of that space, i.e. 'nest' in that space. Due to the close, and preferably unobstructed, proximity of the access stairways 26 to the associated seat(s) 22, the privacy modules 14 provide a psychological extension from the passenger's seat 22 to the berth 30. Therefore, there is not only a physical link between the passenger's seating space and the space in the associated privacy module 14, but also a psychological continuity between the seating space and the space of the associated berth 30.

As further illustrated in FIGS. 1 and 2, the independent privacy modules 14 are spaced apart and not coupled to each other. Each privacy module 14 is independently connected to structural framework of a fuselage of the mobile platform. This allows the privacy modules 14 to be spaced apart in accordance with a seat pitch of the specific mobile platform. More specifically, the distance between each privacy module 14 is associated with the distance between each row of seats 22. Thus, the privacy modules 14 are spaced closer or further apart depending on the space, i.e. pitch, between rows of seats 22. In a preferred embodiment, where the seat pitch is larger, each privacy module 14 only encroaches a seating position in the row of seats 22 associated with the bottom portion of each access stairway 26 without encroaching any seats 22 in the row of seats 22 behind the associated row. That is, spacing the privacy modules 14 in accordance with the seat pitch allows each access stairway 26 to connect the associated seat(s) 22 with the related privacy module 14 without encroaching the row of seats 22 behind the associated row of seats 22. More specifically, the privacy modules 14 are spaced apart such that the upper portion of each access stairway 26 is located to provide ample access to a row of seats 22 behind the row of seats 22 encroached by the bottom portion of each access stairway 26. Thus, the bottom portion of each access stairway 26 is associated with a row of seats 22 and encroaches one seating position within that row, while the upper portion of each access stairway, is located such that there is ample access to the row of seats behind the encroached row of seats. In an alternate preferred embodiment, where the seat pitch is less, each privacy module 14 encroaches one seating position in the row of seats 22 associated with the bottom portion of each access stairway 26 and one seating position in the row of seats 22 behind the associated seats 22. However, it will be appreciated that in this embodiment, only two rows of seats 22 have a seating position encroached by each access stairway 26 and that not all the rows of seats 22 in the mobile platform have seating positions encroached by an access stairway 26.

Furthermore the spacing apart of each independent privacy module 14 allows for aircraft infrastructure, e.g. environmental control system ducts, electrical wiring, other sorts of conduit, to pass between each privacy module 14 and laterally traverse the mobile platform from one side to the other.

Figure 4:
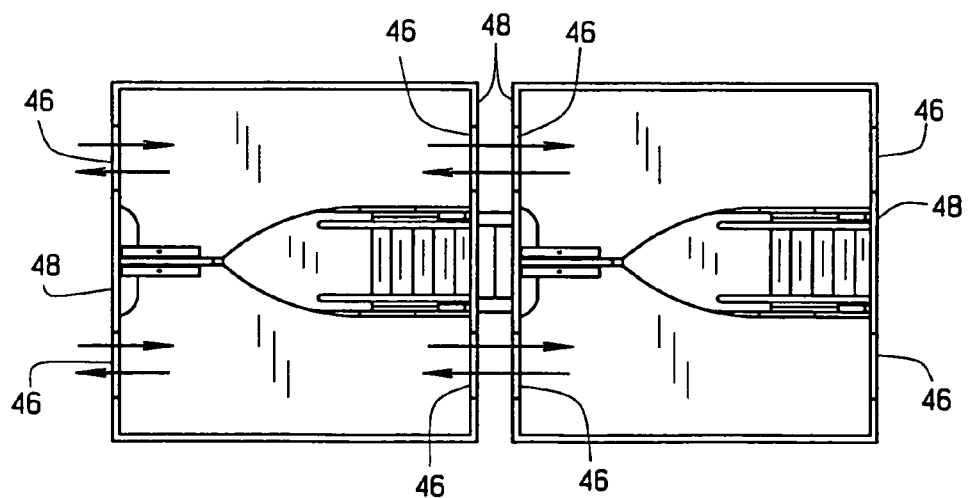
FIG. 4 is top view of a pair of privacy modules illustrating an emergency access included in each privacy module.

FIG. 4 is a top view of a pair of privacy modules 14 illustrating at least one emergency gateway 46. The emergency gateway 46 is included in at least one end wall 48 of each privacy module 14. Regulations may require there must always be an alternate egress of any kind of enclosed space in a mobile platform. Therefore, an alternate egress of the each privacy module 14 is provided by the emergency gateways 46, in case some event blocks the access stairways 26. Each emergency gateway 46 is adapted to allow passengers reposing in the privacy modules 14 to exit each privacy module 14 and enter a longitudinally adjacent privacy module 14 without entering the passenger cabin 18. Therefore, in case of an emergency where the independent private access stairway 26 to any of the privacy modules 14 is blocked, a passenger in such a privacy module 14 can escape to a longitudinally adjacent privacy module 14 via the access gateway 46. Each emergency gateway 46 includes a removable barrier mechanism suitable to block the emergency gateway 46 when emergency egress from the privacy module is not need, but easily removable when emergency egress is needed. For example, the removable barrier mechanism can be a blow out panel or hinged door or locking door.

Figure 5:
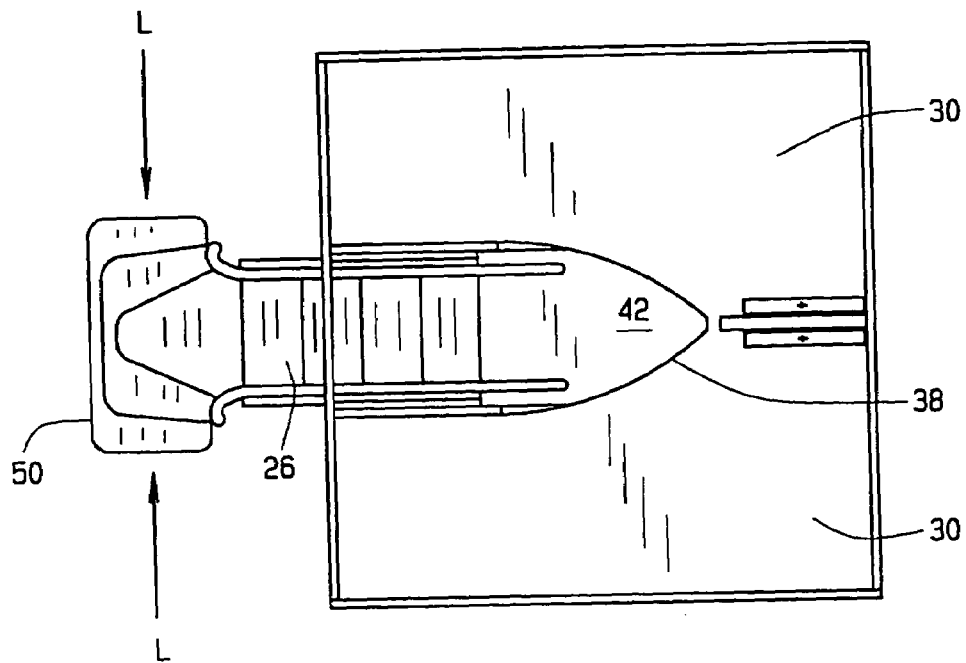
FIG. 5 is a top view of a privacy module illustrating an alternate preferred embodiment of a private access stairway shown in FIG. 1.

FIG. 5 is a top view of a privacy module 14 illustrating an alternate preferred embodiment of the privacy access stairway 26. As illustrated in FIG. 5, each private access stairway 26 penetrates the privacy module 14 via aperture 38. In a preferred alternate embodiment, the bottom portion of each access stairway 26 includes a platform portion 50. The platform 50 includes at least one laterally, or sideward, facing step adapted to provide access to each access stairway 26 from a lateral direction L. Platform 50 provides a smaller footprint for each access stairway 26 so that each access stairway 26 consumes less area in the passenger cabin 18. More specifically, the smaller footprint provides even more space and access to the row of seats behind the row of seats associated with the bottom portion of each access stairway 26.

Figures 6A, 6B:
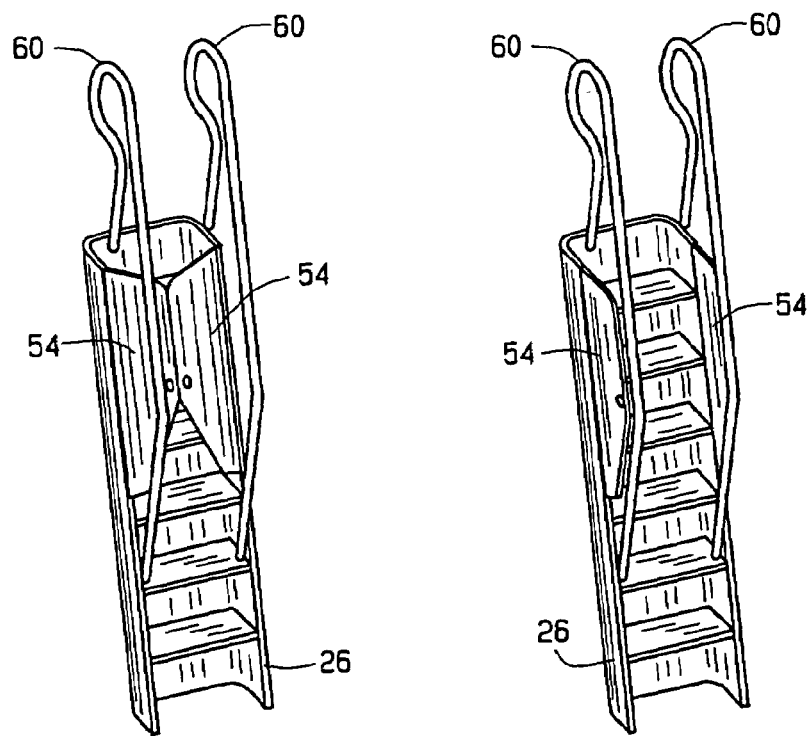
FIG. 6a illustrates a set of security doors included in a preferred embodiment of the access stairway shown in FIG. 1, in a deployed position.
FIG. 6b illustrates the set of security doors shown in FIG. 6a, in a stowed position.

FIGS. 6a and 6b illustrate a set of security doors included in a preferred embodiment of the access stairway 26 shown in FIG. 1. In a preferred embodiment, each access stairway 26 includes at least one security door 54. In a deployed position, shown in FIG. 6a, security doors 54 cover at least a portion of each stairway 26 such that stairway 26 cannot be traversed. It is envisioned that security doors 54 can be locked in the deployed position and only unlocked by an authorized person, e.g. a crew member of the mobile platform. Therefore, during periods when passengers are not allowed to access the privacy modules 14, such as during taxi, take-off and landing of an aircraft, the security doors 54 will be deployed and the access to the privacy modules 14 will be blocked. It is further envisioned that when the passengers are allowed to access the privacy modules 14 the security doors 54 will be placed in a non-deployed position, shown in FIG. 6b. In a preferred embodiment, when the security doors 54 or in the non-deployed position, the security doors 54 will be stowed within or under handrails 60 of each access stairway 26. Alternatively, the security doors 54 can be stowed in any suitable manner sufficient to prevent harm to passengers. That is the security doors 54 will be stowed such they will not interfere with access to the access stairways 26 become hazardous by moving during movement of the mobile platform. Thus, when the security doors 54 are in the non-deployed and stowed position, each access stairway 26 will be freely accessible and have an unhindered path to access to each privacy module.

The modular overhead privacy system 10 includes a plurality of longitudinally spaced apart privacy modules 14 that provide passengers of a mobile platform a private space that is physically and psychologically associated with their seat 22. Each privacy module 14 is independent and spaced apart from the other privacy modules 14, thereby isolating the berth(s) 30 in each privacy module 14 from the berth(s) 30 in the other privacy modules 14. Additionally, each privacy module 14 is accessible by an independent access stairway 26, thereby further isolating each privacy module 14 from the other privacy modules 14. Therefore, the modular overhead privacy system 10 provides passengers of the mobile platform with a high degree of privacy, independence and physical and psychological comfort.

While the invention has been described in terms of various specific embodiments, those skilled in the art will recognize that the invention can be practiced with modification within the spirit and scope of the claims.

What is claimed is:

1. A passenger aircraft comprising:
   a modular overhead privacy system including:
      a plurality of independent privacy modules located longitudinally spaced apart, above a passenger cabin, in an overhead crown area of the aircraft, wherein each said privacy module is physically associated with at least one specific seat in the passenger cabin and encroaches a single seating location in the passenger cabin;
      a plurality of access stairways providing access to the privacy modules from the passenger cabin such that each said privacy module is accessible by a separate independent one of the access stairways; and
      at least one emergency gateway within each said privacy module to allow individuals of the privacy modules to exit each said privacy module and enter a longitudinally adjacent privacy module without entering the passenger cabin.

2. The aircraft of claim 1, wherein each access stairway leads to a privacy module floor platform adapted to allow an individual to comfortably navigate himself/herself within the related privacy module.

3. The aircraft of claim 1, wherein the specific seat physically associated with each independent privacy module is located near a bottom portion of the respective access stairway.

4. The aircraft of claim 1, wherein each said privacy module includes at least one berth adapted to provide an individual a private reposing space separate from the passenger cabin.

5. The aircraft of claim 4, wherein each said berth is further adapted to provide the individual sufficient space for the individual to fully recline.

6. The aircraft of claim 1, wherein each said access stairway includes a set of security doors adapted to prevent traversing of the respective access stairway when the security doors are in a closed position.

7. The aircraft of claim 1, wherein a bottom portion of each access stairway includes a platform including at least one step facing a direction orthogonal to a longitudinal centerline of the passenger cabin and adapted to provide access to the access stairway from a lateral direction.

8. The aircraft of claim 1, wherein the privacy modules are longitudinally spaced apart in accordance with a seat pitch of a plurality of rows of seats in the passenger cabin such that each access stairway descends from its respective privacy module so that a bottom portion of the access stairway is physically associated with a specific row of seats and an upper portion of the access stairway provides sufficient access to a row of seat behind the row of seats associated with the bottom portion of the access stairway.

* * * * *